Dec. 4, 1934.  J. P. JOHNSON  1,982,670
VARIABLE SPEED MECHANISM
Filed Feb. 18, 1932  6 Sheets-Sheet 1

Inventor
JAMES P. JOHNSON.
Kvis Hudson & Kent
attys.

Dec. 4, 1934.   J. P. JOHNSON   1,982,670
VARIABLE SPEED MECHANISM
Filed Feb. 18, 1932   6 Sheets-Sheet 2
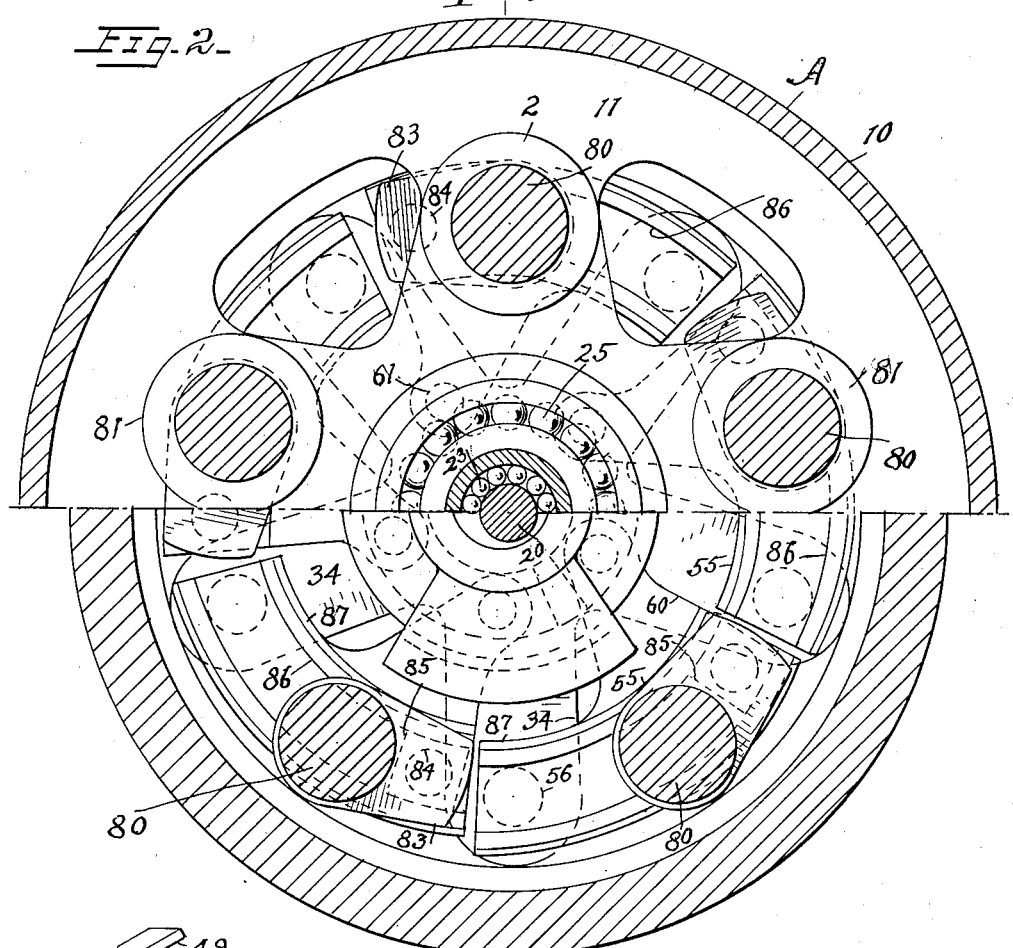
Inventor
JAMES P. JOHNSON.
Kwis Hudson + Kent
attys.

Dec. 4, 1934.  J. P. JOHNSON  1,982,670
VARIABLE SPEED MECHANISM
Filed Feb. 18, 1932   6 Sheets-Sheet 3
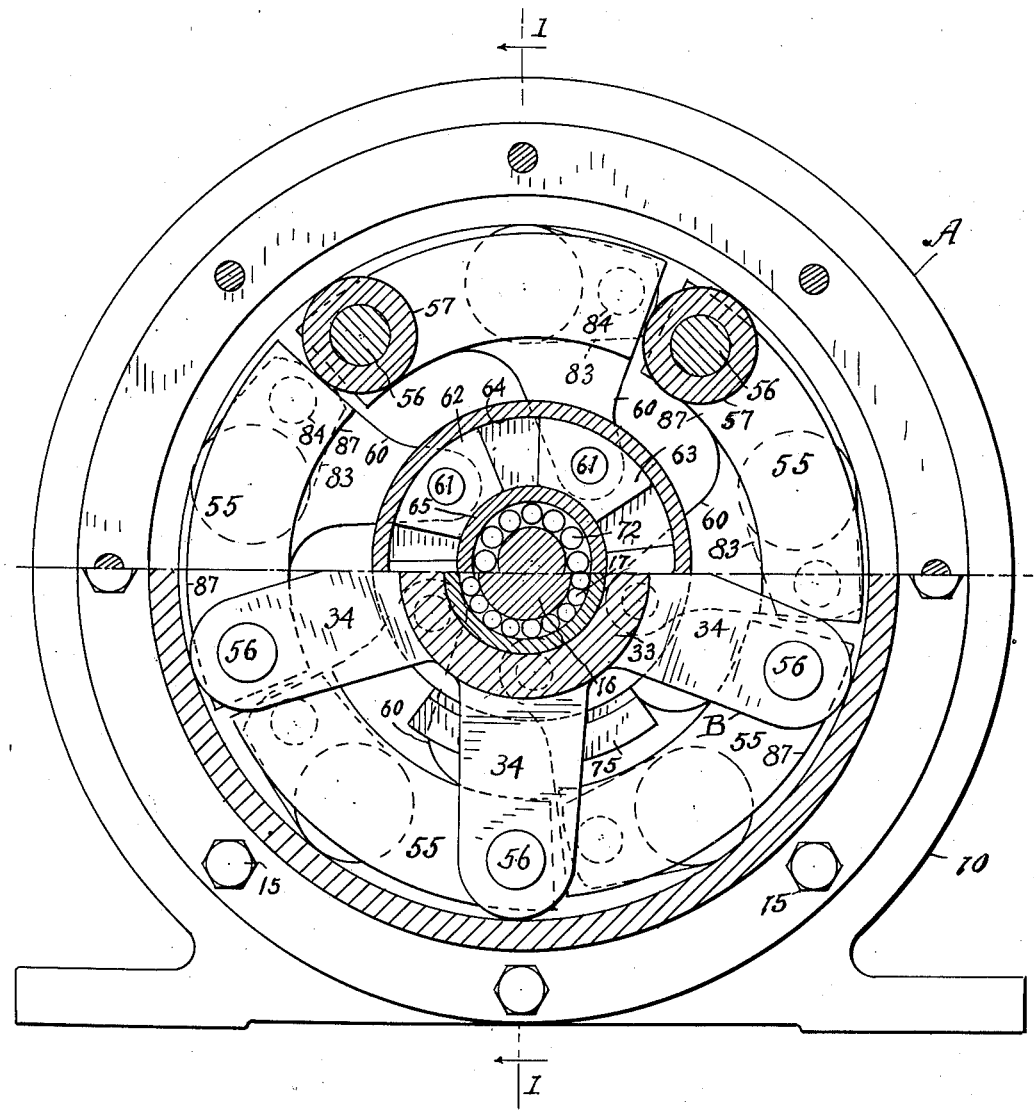
FIG-3-
Inventor:
JAMES P. JOHNSON
Kwis Hudson + Kent
attys.

Dec. 4, 1934.   J. P. JOHNSON   1,982,670
VARIABLE SPEED MECHANISM
Filed Feb. 18, 1932   6 Sheets-Sheet 4
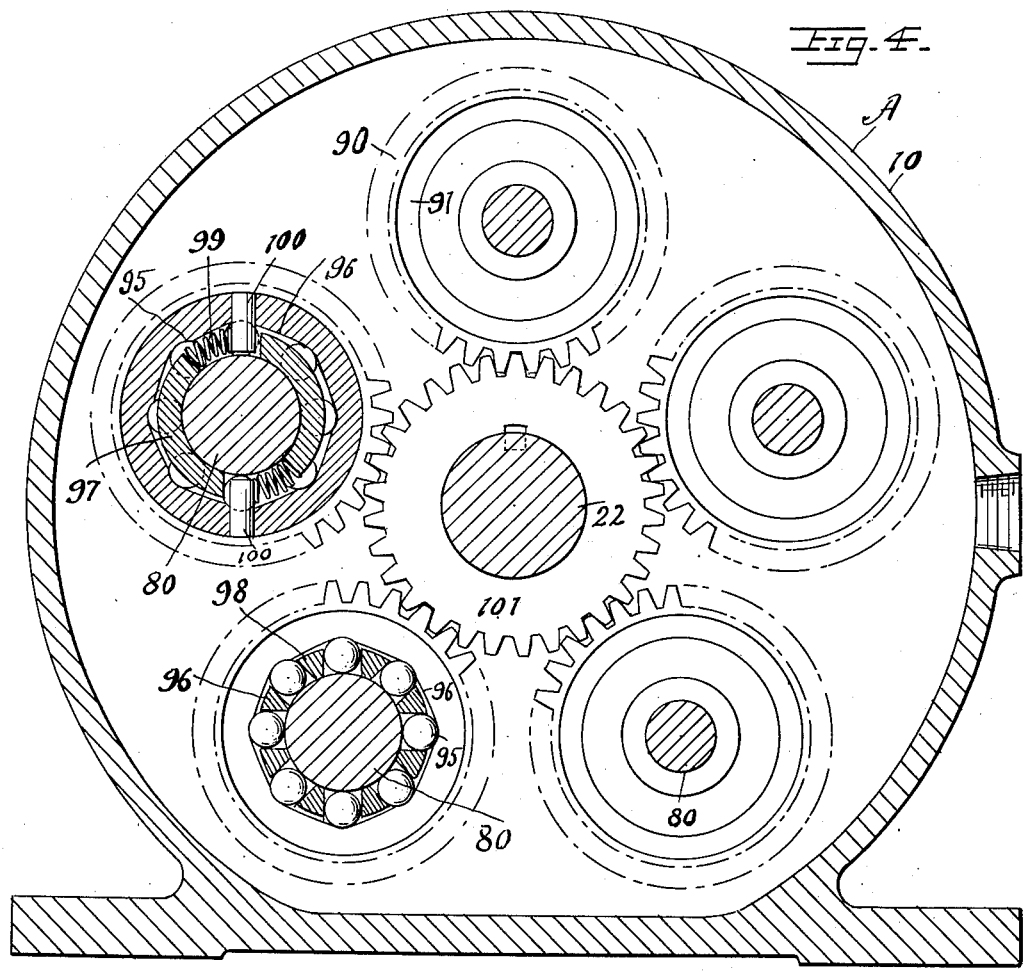

Dec. 4, 1934.   J. P. JOHNSON   1,982,670
VARIABLE SPEED MECHANISM
Filed Feb. 18, 1932   6 Sheets-Sheet 5

Inventor:
JAMES P. JOHNSON.

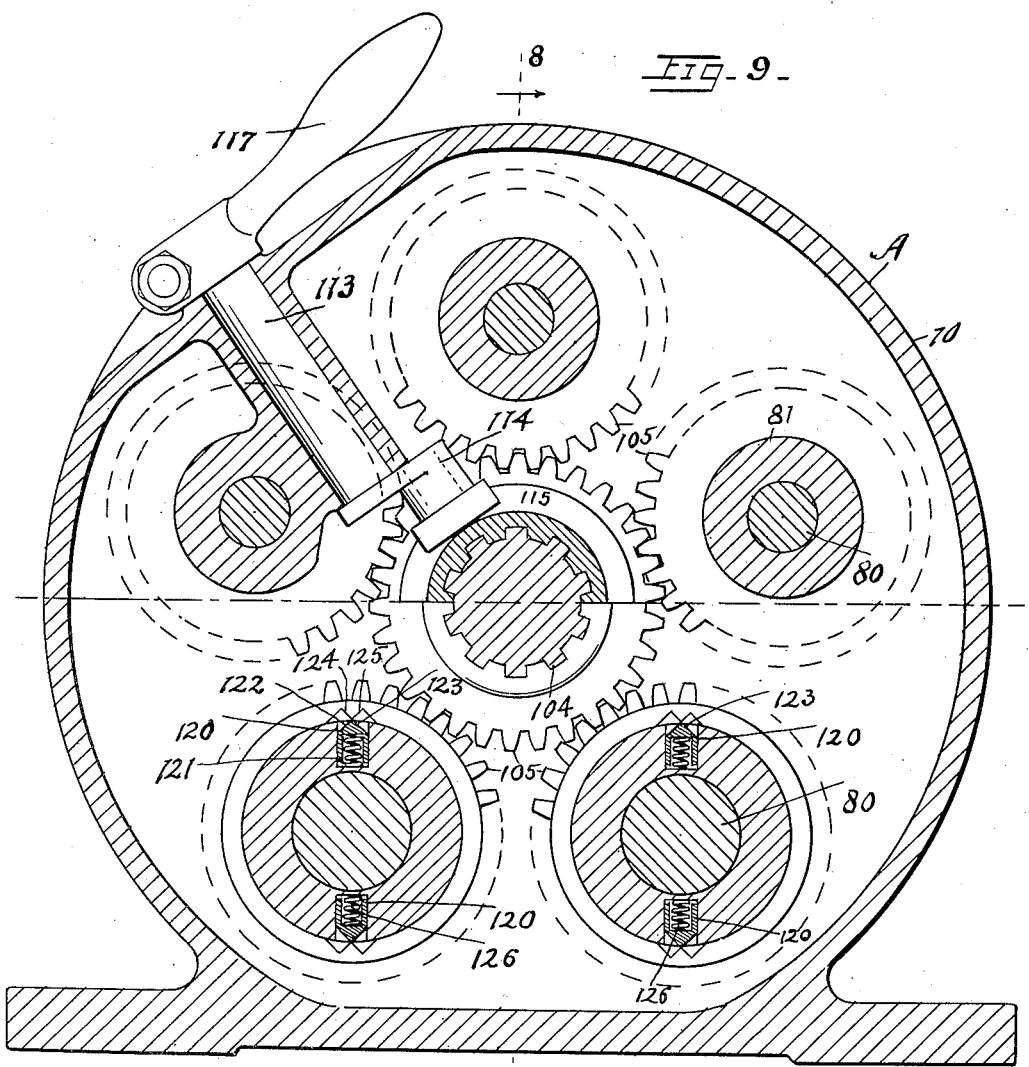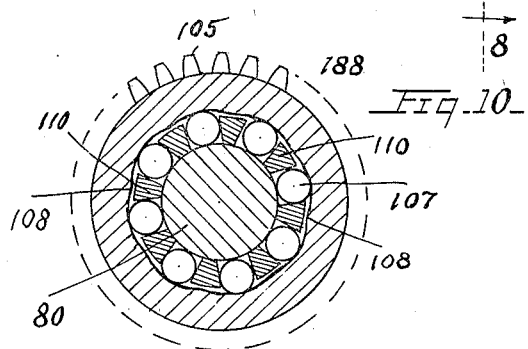

Patented Dec. 4, 1934

1,982,670

UNITED STATES PATENT OFFICE 1,982,670

VARIABLE SPEED MECHANISM

James P. Johnson, Cleveland, Ohio

Application February 18, 1932, Serial No. 593,798

2 Claims. (Cl. 74—119)

The present invention relates to a power transmission mechanism and more particularly to a mechanical transmission of the variable speed type.

An object of the present invention is the provision of a novel power transmission of the variable speed type wherein a rotary motion is transformed into an oscillatory motion and back to a rotary motion at a reduced speed.

Another object of the invention is the provision of novel mechanism for transforming rotary motion into oscillatory motion and varying the extent of the oscillations.

Another object of the invention is the provision of a novel mechanism for transforming oscillatory motion into rotary motion.

Another object of the invention is the provision of a novel, reversible one-way drive clutch.

Another object of the invention is the provision of a novel power transmission mechanism which employs a one-way drive clutch and a rocker member to transmit power from one shaft to another.

Another object of the invention is the provision of a novel variable speed power transmission in which the speed of the driven shaft may be varied from rest to full speed in either direction in an infinite number of steps and without interrupting the transmission of power.

Further objects and advantages of the invention will be apparent to those skilled in the art from the following description of the preferred embodiment of the invention described with reference to the accompanying drawings, in which:

Fig. 2 is a sectional view taken on the line 2—2 of Fig. 1, looking in the direction of the arrows;

Fig. 3 is a sectional view taken on the line 3—3 of Fig. 1, looking in the direction of the arrows;

Fig. 4 is a sectional view, with portions shown in elevation, taken on the line 4—4 of Fig. 1, looking in the direction of the arrows;

Fig. 5 is an end elevational view of the device illustrated in Fig. 1, looking from the right as shown in Fig. 1;

Fig. 6 is a sectional view of the one-way drive clutch shown in Fig. 1, with the clutch reversed to drive in the opposite direction from that shown in Fig 1;

Fig. 7 is a sectional view of the one-way drive clutch taken on the line 7—7 of Fig. 6, looking in the direction of the arrows;

Fig. 9 is a sectional view with portions shown in elevation, taken on the line 9—9 of Fig. 8, looking in the direction of the arrows; and Fig. 10 is a sectional view of the reversible one-way drive clutch taken on the line 10—10 of Fig. 8, looking in the direction of the arrows.

Similar reference characters designate corresponding parts throughout the several figures of the drawings.

Figure 1:
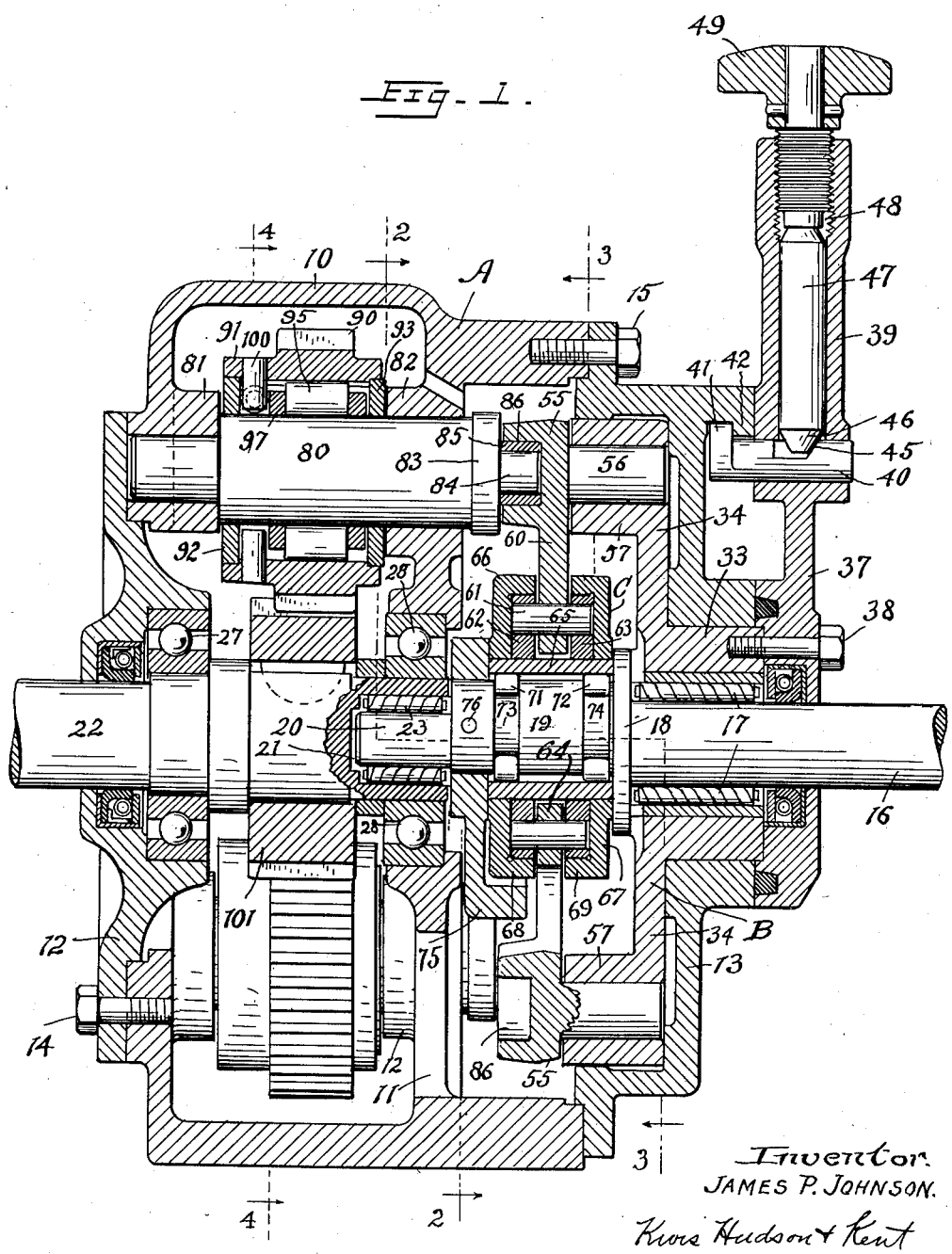
Fig. 1 is a sectional view taken with portions shown in elevation approximately on the lines 1—1 of Figs. 2 and 3, looking in the direction of the arrows.

Referring to the drawings, Figs. 1 to 7 inclusive illustrate the preferred embodiment of the invention. The transmission housing is designated in general by the reference character A and comprises a central portion 10 provided with a partition 11, and two end members 12 and 13 bolted as by bolts 14 and 15 respectively to opposite ends thereof. A driving shaft 16 rotatably supported in the end member 13 by anti-friction bearings 17 has a flange 18, an eccentric 19, and a reduced end portion 20 formed integral therewith. The reduced end portion 20 of the drive shaft 16 is rotatably supported by anti-friction bearings 23 in a cylindrical aperture 21 formed in one end of a driven shaft 22. The driven shaft 22 is rotatably supported in the end plate 12 and the partition 11 of the housing A by anti-friction bearings 27 and 28.

A spider member B consisting of a hub 33 and a plurality of arms 34 is rotatably supported by the end member 13, concentric with the shaft 16. Manual means for rotating the spider member is provided in the form of a disk 37 secured to the hub 33 by the bolts 38, and provided with a hand grasp lever 39. The hand grasp lever 39, together with the spider member B, etc., is locked in any desired position by a lock bolt 40 having a head 41 which engages a flange 42 formed integral with the end member 13. The lock bolt 40 is drawn to the right, as shown in Fig. 1, to lock the parts in the desired position by means of cooperating cam surfaces 45 and 46 formed on the lock bolt 40 and on a cam bolt 47 respectively. The cam bolt 47 is slidably carried in an aperture 48 formed in the hand grasp lever 39 and is moved therein to engage the cam surfaces 45 and 46 by a thumb screw 49 threaded into the outer end of the aperture 48.

In the embodiment of the invention illustrated, a plurality of L-shaped rocker members 55 are rotatably supported by the spider member B previously referred to. Each of the rocker members 55 has a pin 56 formed integral therewith which engages in a suitable aperture in a boss 57 formed integral with an arm 34 of the spider member B. One arm 60 of the rocker member 55 extends radially toward the axis of the driving shaft 16 and is pivotally connected by means of a pin 61 to pairs of blocks 62 and 63 slidably supported in an annular guideway 64 in a pitman box C. The pitman box C consists of a cylindrical member 65 and two disk members 66 and 67 bolted or otherwise secured thereto. The disk members 66 and 67 have annular axially projecting flanges 68 and 69 respectively and with the cylindrical member 65 form the guideways 64 for the pair of blocks 62 and 63. The pitman box is rotatably supported by the eccentric 19 by means of antifriction bearings in the form of rollers 71 and 72 positioned in annular grooves 73 and 74 respectively formed in the periphery of said eccentric. A counterweight 75 is non-rotatably secured to one end of the eccentric 19, as by a pin 76.

A plurality of crank-shafts 80 equally spaced about the driven shaft 22 are rotatably supported in suitable bosses 81 and 82 in the central member 10 and the partition 11 respectively of the housing A. Each of the crank-shafts 80 has a crank arm 83 provided with crank pins 84 at a fixed distance from the axis of the crank-shaft. The crank pin 84 engages in a suitable aperture formed in a rectangular block 85 slidably supported in an arcuately shaped guideway 86 formed in an arm 87 of the rocker members 55.

The construction is such that, as the driving shaft is rotated, the rocker member 55 is oscillated about it spivotal support on the arm 34 of the spider member B, and the oscillation of the rocker member 55 causes an oscillation of the crank-shafts 80, the amount of which may be varied by varying the distance between the crank pin 84 and the axis about which the rocker member 55 is pivotally supported. The crank-shaft 80 is fixed in the housing A and the distance between the crank pin 84 and the axis about which the rocker member 55 is pivotally supported may be varied by rotation of the spider member B to move the pin 56 toward or from the crank pin 84. When the axis about which the rocker member is pivotally supported and that of the crank pin 84 coincide, no motion will be imparted to the crank-shaft 80.

A gear 90, provided with a hub 91, is rotatably supported by means of bearing members 92 and 93 on each of the crank-shafts 80. The gear 90 is operatively connected to the crank-shaft 80 by a one-way drive clutch in the form of rollers 95 positioned between the gear and the shaft, and cooperating cam surfaces 96 formed on the interior of the hub 91. The rollers 95 are positioned in suitable openings formed in an annular cage member 97 and held in predetermined spaced relation thereby. The cage member 97 is rotatable about the shaft 80 and relative to the gear 90, and is continuously urged in a counter-clockwise direction, as shown in Fig. 1, to operatively engage the rollers 95 with the cam surfaces 96 by springs 99 positioned in cutaway portions of the cage member and compressed between parts thereof and pins 100 fixed in the hub 91 of the gear 90 in any suitable manner. The construction of the cam surfaces 96 is such that they converge toward the center of the crank-shaft 80 in a counter-clockwise direction as viewed in Fig. 4. Each of the gears 90 is continuously in mesh with a central gear 101 keyed to the driven shaft 22. The construction of gear 90 and the one-way drive clutch is such that they may be removed as a unit from the crank-shaft 80 and reversed in position thereon, as shown in Figs. 6 and 7, to reverse the direction of the rotation imparted to the driven shaft 22.

From the description just given, it will be apparent that the oscillations of the crank-shaft 80 will be transmitted to the driven shaft 22 in the form of intermittent uni-directional rotational movement through the roller clutch, and the gears 90 and 101. In the embodiment of the invention illustrated, five duplicate power transmissions or connections are employed between the driving and driven shafts, but the number may be varied as required within the scope of this invention. The employment of a plurality of transmissions or connections as shown enables the shaft 22 to be driven at a continuous uniform speed. Because the rocker members 55 are all oscillated from the same eccentric 19 and the crank-shafts 80 equally spaced about the driving and the driven shafts which are in axial alignment, a continuous driving cycle is produced, the load being carried by successive power transmissions or connections.

As illustrated, the spider member B is rotated about the axis of the driving shaft 16 to vary the distance between the crank pins 84 and the axis of the pivotal supports 56, but it is understood that the rocker members 55 may be pivotally supported at fixed positions on the frame and the crank-shafts 80 and/or the crank pins 84 movably supported to vary the distance between the crank pins 84 and the axis of the pivotal supports 56.

Figure 8:
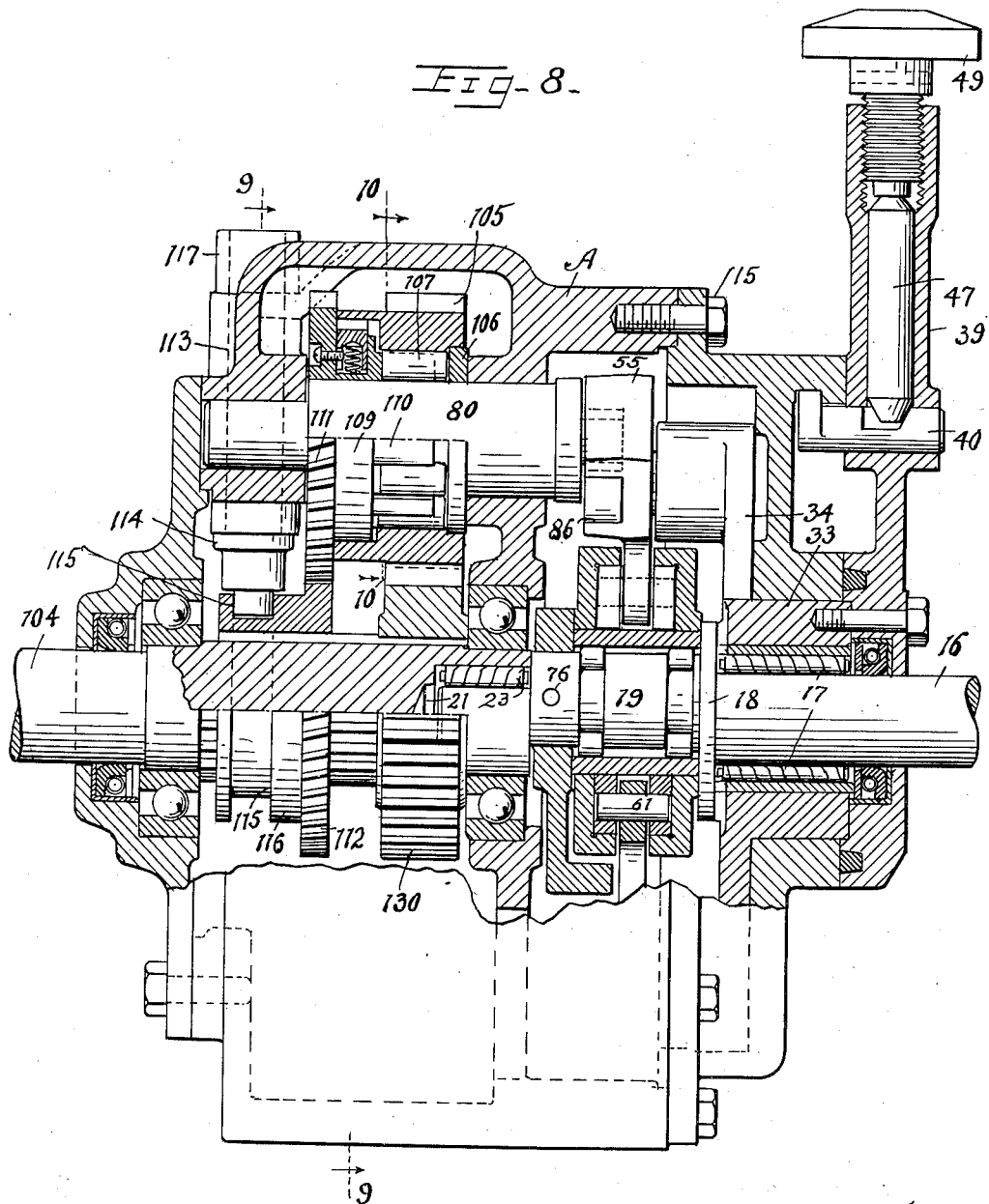
Fig. 8 is a sectional view, with portions shown in elevation, of a modified construction, taken approximately on the line 8—8 of Fig. 9, looking in the direction of the arrows.

Figs. 8, 9 and 10 show a modified construction of the device illustrated in Figs. 1 to 7 inclusive. The construction of the device illustrated in these figures is the same as that shown in the preferred embodiment with the exception of the driving mechanism between the crank-shaft 80 and the driven shaft which, in this instance, is indicated by the reference character 104. The same reference characters are used to identify the parts which are duplicated in each construction.

Each of the crank-shafts 80 carries a gear 105 rotatably supported thereon by a bearing member 106 and a reversible one-way drive clutch comprising rollers 107 positioned between the gear 105 and the crank-shaft 80, and cooperating cam surfaces 108 formed on the interior of the gear 105. The cam surfaces 108 are such that the rollers 107 operatively engage the crank-shaft 80 as they are moved relative to the gear 105 in either direction from the position shown in Fig. 10. The construction of the roller clutch just described differs in this respect from that shown in the preferred embodiment where the cam surfaces are designed to operate only in one direction. The rollers are held in predetermined spaced positions and moved relative to the gear 105 by means of an annular cage member 109 rotatably supported on the crank-shaft 80 and movable relative to the gear 105. The cage member 109 carries axially projecting members 110 which extend between adjacent rollers and has formed integrally therewith a spiral gear 111.

The cage member 109 is adapted to be rotated in opposite directions relative to the gear 105 to reverse the driving direction of the reversible one-way drive clutch by means of a spiral gear 112 slidably keyed to the driven shaft 104 and moved axially thereon by a crank lever 113. The crank lever 113 has a hand grasp 117 formed on one end thereof and carries a crank arm 114 at the other end thereof which engages in an annular groove 115 formed above the periphery of the hub 116 of the spiral gear 112. The roller clutch is resiliently held in either of its operating positions by spring-pressed plungers 120 slidably supported in suitable apertures 121 formed in the cage member 109. The plungers 120 have cam surfaces 122 and 123 formed on the outer ends thereof which are continuously urged into engagement with cam surfaces 124 and 125 formed on the gear 105 by springs 126.

The construction of the reversible one-way driving clutch is such that the cage member 109, together with the rollers therein, is rotated in opposite directions relative to the gear 105 by axial movement of the spiral gear 112 which meshes with the spiral gear 111 because of the inclination of the teeth formed on these gears. After the cage 109 has been rotated in either direction, it is held in that position and the rollers resiliently urged to their operating position by the cooperating cam surfaces 123, 124, or 122, 125. The gear 105 is continuously in mesh with a gear 130 keyed to the driven shaft 104, and the gears 112 and 130, 105 and 111 are of equal size so that the cage member 109 and gear 105 will rotate at uniform velocities, otherwise the relative positions of these members would not remain the same.

From the description of the modified construction illustrated in Figs. 8 to 10 inclusive, it will be apparent that the direction of rotation of the shaft 104 may be reversed merely by moving the hand lever 117 to engage the rollers 107 with opposite parts of the cam surfaces 108. In both the preferred and modified constructions of the invention illustrated, five parallel power transmissions or connections are shown between the driving shaft and the driven shaft equally spaced about the axis of these shafts. In other words, there are five rocker members 55, crankshafts 80, and one-way drive clutches directly formed with gears which are continuously in mesh with a central gear on the driven shaft. In each embodiment illustrated, all of the power transmissions or connections between the driving and the driven shafts are duplicates in construction, and the number may be varied as required within the scope of this invention.

While the invention has been described with reference to the preferred embodiment and a modification, it is to be understood that it is capable of various modifications within its scope and that the application is intended to cover any and all variations, uses or adaptations thereof following in general the principle of the invention and including such departures from the present disclosure as come within knowledge or customary practice in the art to which it pertains, and as may be applied to the essential features set forth and as fall within the scope of the invention; and I particularly point out and claim as my invention:

Having thus described my invention I claim:

1. A power transmission comprising a drive shaft, a driven shaft, a plurality of intermediate shafts, means operatively connecting said drive shaft and said intermediate shafts for oscillating said intermediate shafts upon rotation of said drive shaft, a plurality of members rotatably supported by said intermediate shafts, cam surfaces on the interior of said members, reversible one-way drive clutches between said members and said intermediate shafts, means operatively connecting said members and said driven shaft, said reversible one-way drive clutches comprising rollers positioned between said members and said intermediate shafts and cooperating with said cam surfaces on said members, roller cages embracing said rollers, a spiral gear connected to each of said roller cages, a second spiral gear keyed to said driven shaft and in mesh with the first mentioned spiral gears, and means for moving said second mentioned spiral gear longitudinally of said driven shaft whereby said roller cages are simultaneously moved relative to said members.

2. A power transmission comprising a drive shaft, a driven shaft, a plurality of intermediate shafts, means operatively connecting said drive shaft and said intermediate shafts adapted to oscillate said intermediate shafts upon rotation of said drive shaft, a gear rotatably supported on each of said intermediate shafts, cam surfaces formed on the interior of said gears, reversible one-way drive clutches for operatively connecting said gears with said intermediate shafts, a gear on said driven shaft continuously in mesh with said first mentioned gears, said reversible one-way drive clutch comprising rollers positioned between said intermediate shafts and said cam surfaces, roller cages adapted to move said rollers relative to said gears, a spiral gear on each of said roller cages, a second spiral gear slidably keyed to said driven shaft, and means for moving said second mentioned spiral gear longitudinally of said driven shaft to simultaneously move said roller cages relative to said members and thereby reverse the driving direction of said reversible one-way drive clutch.

JAMES P. JOHNSON.